United States Patent [19]

Eck et al.

[11] 4,247,438

[45] Jan. 27, 1981

[54] PROCESS FOR THE MANUFACTURE OF AQUEOUS ETHYLENE/VINYL CHLORIDE/VINYL ALKANOATE AND/OR ALKYL ACRYLATE COPOLYMER DISPERSIONS HAVING A NON-UNIFORM PARTICLE SIZE DISTRIBUTION

[75] Inventors: Herbert Eck; Klaus Häfener; Hubert Wiest, all of Burghausen, Fed. Rep. of Germany

[73] Assignee: Wacker-Chemie GmbH, Munich, Fed. Rep. of Germany

[21] Appl. No.: 63,082

[22] Filed: Aug. 2, 1979

[30] Foreign Application Priority Data

Aug. 31, 1978 [DE] Fed. Rep. of Germany ....... 2837992

[51] Int. Cl.$^3$ ............................................. C08L 27/06
[52] U.S. Cl. ............................................... 260/29.6 T
[58] Field of Search ................................... 260/29.6 T

[56] References Cited

U.S. PATENT DOCUMENTS

| | | | |
|---|---|---|---|
| 3,632,542 | 1/1972 | Fox et al. | 260/29.6 T |
| 3,639,326 | 2/1972 | Kray et al. | 260/29.6 T |
| 3,830,761 | 8/1974 | Lenney | 260/29.6 T |

FOREIGN PATENT DOCUMENTS

2141864 3/1973 Fed. Rep. of Germany .
2252285 8/1973 Fed. Rep. of Germany .
1338924 11/1973 United Kingdom .

*Primary Examiner*—Maurice J. Welsh
*Attorney, Agent, or Firm*—Hammond & Littell, Weissenberger and Muserlian

[57] ABSTRACT

Aqueous ethylene/vinyl chloride/vinyl alkanoate and/or alkyl acrylate copolymer dispersions having a non-uniform particle size distribution, in which one particle size distribution maximum is at 0.03 to 0.2$\mu$ and a second maximum is at 0.15 to 1$\mu$ and in which 5% to 60% by weight of the particles belong to the amount of particles having said second maximum, which are produced by free-radical polymerization at 0° to 90° C., while stirring, in the presence of emulsifiers which, in amounts of 0.5% to 15% by weight, calculated on the final solid resin, are not added until a polymerization conversion of 1% to 60% by weight of the total amount of monomer has been reached. The copolymer dispersions have solids contents of 20% to 70% by weight of copolymer comprising 20% to 92% by weight of vinyl chloride, 5% to 60% by weight of ethylene and 3% to 75% by weight of vinyl esters and/or acrylic acid esters, and, optionally, up to 15% by weight of other monomers copolymerizable with ethylene and vinyl chloride, said monomers being metered into the polymerization mixture together with the emulsifiers during the manufacturing process.

13 Claims, No Drawings

PROCESS FOR THE MANUFACTURE OF AQUEOUS ETHYLENE/VINYL CHLORIDE/VINYL ALKANOATE AND/OR ALKYL ACRYLATE COPOLYMER DISPERSIONS HAVING A NON-UNIFORM PARTICLE SIZE DISTRIBUTION

BACKGROUND OF THE INVENTION

This invention relates to aqueous ethylene/vinyl chloride/vinyl alkanoate and/or alkyl acrylate copolymer dispersions having a non-uniform particle size distribution, in which one particle size distribution maximum is at 0.03 to $0.2\mu$ and a second maximum is at 0.15 to $1\mu$ and in which 5% to 60% by weight of the particles belong to the amount of particles having said second maximum, as well as the method of production.

Previous processes for the manufacture of aqueous polymer dispersions have all been aimed at producing as uniform as possible a particle size distribution. As a rule of thumb, it can be assumed from German Published Application DE-OS No. 22 52 285, page 12, 2nd paragraph, that "the more the emulsifier is used, the finer are the particles." Furthermore, the desired particle size can be obtained by varying the emulsifier and protective colloid systems.

It is also known to produce dispersions with a low final concentration of dispersion auxiliaries by using seed latices. Frequently the amount of dispersion auxiliary required for the entire polymerization for the purpose of stabilization is introduced into the polymerization mixture through the seed latex. A disadvantage with this method, however, is the inadequate final stability of the dispersions (see DE-OS No. 21 41 864) and the frequently necessary long metering in times (6 to 18 hours). In addition, when using seed latices the particle size distribution is also substantially already predetermined.

OBJECTS OF THE INVENTION

An object of the present invention is the production of aqueous ethylene/vinyl chloride/vinyl alkanoate and/or alkyl acrylate copolymer dispersions having a non-uniform particle size distribution, in which at least one particle size distribution maximum is between 0.03 and $0.2\mu$ and the second particle size distribution is at 0.15 to $1\mu$ which are distinguished by comparatively low viscosity, especially when they have a high solids content.

Another object of the present invention is the production of aqueous ethylene/vinyl chloride/vinyl alkanoate and/or alkyl acrylate copolymer dispersions having a non-uniform particle size, in which one particle size distribution maximum is at 0.03 to $0.2\mu$ and a second maximum is at 0.15 to $1\mu$ where said second maximum particle size range differs from the first by at least $0.1\mu$ and wherein the mass of particles in the particle size distribution curve of the second maximum is from 5% to 60% of the total mass of particles, said dispersion having a solids content of between 20% and 70% by weight and an emulsifier content of from 0.5% to 10% by weight, based on the total amount of monomers, said copolymer consisting of:
from 20% to 92% by weight of vinyl chloride units,
from 5% to 60% by weight of ethylene units,
from 3% to 75% by weight of monomer units selected from the group consisting of:
(1) vinyl esters of unbranched alkanoic acids having from 1 to 18 carbon atoms,
(2) vinyl esters of branched alkanoic acids having from 4 to 18 carbon atoms,
(3) acrylic acid esters of unbranched alkanols having from 1 to 12 carbon atoms,
(4) acrylic acid esters of branched alkanols having from 3 to 12 carbon atoms, and
(5) mixtures thereof, and
from 0 to 15% by weight of other monomer units copolymerizable with ethylene and vinyl chloride.

A yet further object of the present invention is the development of a process for the production of an aqueous ethylene/vinyl chloride/vinyl alkanoate and/or alkyl acrylate copolymer dispersion wherein said copolymer consists of:
from 20% to 92% by weight of vinyl chloride units,
from 5% to 60% by weight of ethylene units,
from 3% to 75% by weight of monomer units selected from the group consisting of:
(1) vinyl esters of unbranched alkanoic acids having from 1 to 18 carbon atoms,
(2) vinyl esters of branched alkanoic acids having from 4 to 18 carbon atoms,
(3) acrylic acid esters of unbranched alkanols having from 1 to 12 carbon atoms,
(4) acrylic acid esters of branched alkanols having from 3 to 12 carbon atoms, and
(5) mixtures thereof, and
from 0 to 15% by weight of other monomer units copolymerizable with ethylene and vinyl chloride,
having a non-uniform particle size, in which one particle size distribution maximum is at 0.03 to $0.2\mu$ and a second maximum is at 0.15 to $1\mu$, where said second maximum particle size range differs from the first by at least $0.1\mu$ and wherein the mass of particles in the particle size distribution curve of the second maximum is from 5% to 60% of the total mass of particles, said copolymer dispersion having a solids content of between 20% and 70% by weight and an emulsifier content of from 0.5% to 10% by weight, based on the total amount of monomers, consisting essentially of heating substantially all of the water and at least some of the total amount of vinyl chloride, ethylene, said monomer units, and, optionally, said other monomer units to a temperature of between 0° and 90° C. and at an ethylene pressure of between 1 and 150 bar in the presence of a free-radical polymerization catalyst under agitation, and after a monomer conversion of from 1% to 60% by weight metering in from 0.5% to 10% by weight, based on the total amount of solid copolymer, of at least one polymerization emulsifier, together with the remainder of said water, said vinyl chloride, said ethylene, said monomer units, as well, optionally, of said other monomer units, while maintaining said agitation, temperature and ethylene pressure for a time sufficient to complete monomer polymerization, and recovering said copolymer dispersion.

These and other objects of the invention will become more apparent as the description thereof proceeds.

DESCRIPTION OF THE INVENTION

The subject of the invention is aqueous ethylene/vinyl chloride/vinyl alkanoate and/or alkyl acrylate copolymer dispersions, with a non-uniform particle size distribution maximum of the copolymer and a solids content of between 20% and 70% by weight, which dispersions contain 0.5% to 10% by weight, based on the copolymer content, of emulsifiers and are characterized in that the copolymer particles have one particle size distribution maximum at 0.03 to 0.2μ and a second particle size distribution maximum at 0.15 to 1μ, wherein the mass of particles contributing to the particle size distribution curve of the second maximum is 5% to 60% by weight of the total mass of particles, said copolymer consisting of:

20% to 92%, preferably 45% to 85%, by weight of vinyl chloride units,

5% to 60%, preferably 5% to 30%, by weight of ethylene units,

3% to 75%, preferably 5% to 35%, by weight of monomer units from vinyl esters of aliphatic branched or unbranched carboxylic acids having 1 to 18 carbon atoms and/or acrylic esters of aliphatic branched or unbranched alcohols having 1 to 12 carbon atoms, and 0 to 15% by weight of other monomer units copolymerizable with vinyl chloride and ethylene.

More particularly, the present invention relates to aqueous ethylene/vinyl chloride/vinyl alkanoate and/or alkyl acrylate copolymer dispersions having a non-uniform particle size, in which one particle size distribution maximum is at 0.03 to 0.2μ and a second maximum is at 0.15 to 1μ where said second maximum particle size range differs from the first by at least 0.1μ and wherein the mass of particles in the particle size distribution curve of the second maximum is from 5% to 60% of the total mass of particles, said dispersion having a solids content of between 20% and 70% by weight and an emulsifier content of from 0.5% to 10% by weight, based on the total amount of monomers, said copolymer consisting of:

from 20% to 92% by weight of vinyl chloride units,
from 5% to 60% by weight of ethylene units,
from 3% to 75% by weight of monomer units selected from the group consisting of:
(1) vinyl esters of unbranched alkanoic acids having from 1 to 18 carbon atoms,
(2) vinyl esters of branched alkanoic acids having from 4 to 18 carbon atoms,
(3) acrylic acid esters of unbranched alkanols having from 1 to 12 carbon atoms,
(4) acrylic acid esters of branched alkanols having from 3 to 12 carbon atoms, and
(5) mixtures thereof, and
from 0 to 15% by weight of other monomer units copolymerizable with ethylene and vinyl chloride.

A further subject of the invention is a process for the manufacture of the above aqueous ethylene/vinyl chloride/vinyl alkanoate and/or alkyl acrylate copolymer dispersions, with a non-uniform particle size distribution maximum of the copolymer and a solids content of between 20% and 70% by weight, in the presence of free-radical polymerization initiators, in one process step, at temperatures beween 0° and 90° C., preferably 10° and 50° C., and at ethylene pressures of between 1 and 150 bar, preferably 10 to 100 bar, while stirring, characterized in that only after a monomer conversion of 1% to 60% by weight, preferably 1% to 40% by weight, of the total quantity of monomer, are the emulsifiers metered in in a quantity of 0.5% to 10% by weight, preferably 2% to 6% by weight, calculated on solid resin, together with, optionally, 0 to 15% by weight of auxiliary monomers.

More particularly, the present invention also relates to a process for the production of an aqueous ethylene/vinyl chloride/vinyl alkanoate and/or alkyl acrylate copolymer dispersion wherein said copolymer consists of:

from 20% to 92% by weight of vinyl chloride units,
from 5% to 60% by weight of ethylene units,
from 3% to 75% by weight of monomer units selected from the group consisting of:
(1) vinyl esters of unbranched alkanoic acids having from 1 to 18 carbon atoms,
(2) vinyl esters of branched alkanoic acids having from 4 to 18 carbon atoms,
(3) acrylic acid esters of unbranched alkanols having from 1 to 12 carbon atoms,
(4) acrylic acid esters of branched alkanols having from 3 to 12 carbon atoms, and
(5) mixtures thereof, and
from 0 to 15% by weight of other monomer units copolymerizable with ethylene and vinyl chloride,
having a non-uniform particle size, in which one particle size distribution maximum is at 0.03 to 0.2μ and a second maximum is at 0.15 to 1μ, where said second maximum particle size range differs from the first by at least 0.1μ and wherein the mass of particles in the particle size distribution curve of the second maximum is from 5% to 60% of the total mass of particles, said copolymer dispersion having a solids content of between 20% and 70% by weight and an emulsifier content of from 0.5% to 10% by weight, based on the total amount of monomers consisting essentially of heating substantially all of the water and at least some of the total amount of vinyl chloride, ethylene, said monomer units, and, optionally, said other monomer units to a temperature of between 0° and 90° C. and at an ethylene pressure of between 1 and 150 bar in the presence of a free-radical polymerization catalyst under agitation, and after a monomer conversion of from 1% to 60% by weight metering in from 0.5% to 10% by weight, based on the total amount of solid copolymer, of at least one polymerization emulsfier, together with the remainder of said water, said vinyl chloride, said ethylene, said monomer units, as well, optionally, of said other monomer units, while maintaining said agitation, temperature and ethylene pressure for a time sufficient to complete monomer polymerization, and recovering said copolymer dispersion.

The emulsifiers employed are those substances which can form micella in an aqueous medium. Such substances advantageously contain both hydrophilic and hydrophobic groups. They furthermore reduce the surface tension of water and can be used either individually or in combination. Both nonionic and anionic emulsifiers or surface-active compounds are of interest in the present case. The following are mentioned by way of example: alkali metal salts or alkaline earth metal salts of alkylated benzene sulfonic and naphthalene sulfonic acids, such as sodium dodecylbenzene sulfonate, alkali metal alkyl sulfonates, such as, for example, sodium lauryl sulfonate, salts of monoalkyl sufuric acids, such as sodium lauryl sulfate, also sodium alkylsulfosuccinate or sodium alkylsulfosuccinate esters and half esters, sodium or ammonium salts of sulfate esters of alkylphenoxypoly(ethoxy)ethanols, such as sodium octylphenoxypoly(ethoxy)ethyl sulfate or sodium isononylphenoxypoly(ethoxyethyl)sulfate, ethylene oxide adducts of alkanols, alkanediols and alkylphenols, block copolymers of ethylene oxide and propylene oxide and sulfated ethylene oxide adducts onto fatty acid amides, fatty alcohols, or fatty amines.

The emulsifiers are added to the polymer dispersion in a total of quantities between 0.5% and 10% by weight, based on the total amount of monomers.

The solids contents of the dispersions according to the invention can be varied between 20% and 70% by weight. Even with a high solids content the dispersions have a comparativevly low viscosity.

The copolymer dispersions according to the invention contain copolymer particles which are divided into two particle size distribution maxima in each case. The mass of particles contributing to the particle size distribution curve of the second maximum should constitute 5% to 60% by weight of that of the total mass of particles. Advantageous particle size distribution maxima in the copolymer dispersions according to the invention are at 0.03 to $0.2\mu$ and 0.15 and $1\mu$, respectively. In many cases, further particle size distribution maxima which are less pronounced may be observed in addition. The particle size distribution maxima should differ from one another by at least $0.1\mu$.

The polymerization is generally carried out with redox catalyst systems. In this polymerization process, either the reducing agent and the oxidizing agent can be metered in accordance to the reaction, or the total amount of oxidizing agent can be introduced at the beginning and the polymerization controlled by metering in the reducing agent. Approximately 0.01% to 0.5% by weight, preferably 0.03% to 0.3% by weight, of reducing agent and 0.01% to 2% by weight, preferably 0.03% to 0.8% by weight, of oxidizing agent is required, and depending on the process, the ratio of oxidizing agent to reducing agent is from 1:1 to 6:1.

Examples of the catalyst components having an oxidizing action are ammonium or potassium persulfate, hydrogen peroxide, t-butyl hydroperoxide and peroxydiphosphates, such as, for example, potassium, sodium or ammonium peroxydiphosphate. Examples of the reducing agent components are sodium sulfite, sodium bisulfite, and zinc or sodium formaldehyde sulfoxylate. Also suitable are $H_2$/noble metal catalysts with the simultaneous use of small amounts of heavy metal salts as activators. Suitable redox catalyst systems are described, inter alia, in "Fundamental Principles of Polymerization," G. F. Alelio, John Wiley and Sons, Inc., New York, 1952, on pages 333 ff.

In principle the use of free-radical catalysts, for example, persulfates or peroxydiphosphates, in the absence of a reducing agent is also possible. Both with this system and with that mentioned above, it is possible to use accelerators with, for example, traces of iron salts.

The copolymerization is generally carried out at a pH of between 2.5 and 7. The pH range of 2.5 to 7 can, however, also be exceeded or gone below. The pH initially can be adjusted with small amounts of acids or bases. Also buffers can be added to prevent too marked a drop in the pH during polymerization. Examples of such buffers are sodium or ammonium bicarbonate, borax, sodium acetate and sodium citrate, and mixtures of primary and secondary alkali metal phosphates.

The latices according to the invention are preferably produced according to the metering method. It is also possible, however, for the whole quantity of monomer to be present at the beginning. In the metering method, preferably 10% to 30% by weight of the vinyl chloride used and of the other comonomers apart from ethylene and of the substances mentioned among other copolymerizable monomers is added at the beginning, and the rest is metered in. The nature of the addition of the emulsifier and, where applicable, of the protective colloids and the quantities thereof are important. Addition of the emulsifiers and, where applicable, small amounts of protective colloids must be started at the latest when the solids content of the dispersion has reached 45% by weight. Since, in practice, this point in time can be determined often only with difficulty or too late, it is advisable to start to meter in the emulsifiers and, where applicable, small amounts of protective colloids at the latest when a solids content of 35% by weight has been determined. Dispersions having solids contents of up to a maximum of 45% by weight, if they have been produced without emulsifier addition, are stable to settling even if no emulsifier and, where applicable, no small quantities of protective colloid have been added. On the other hand, the polymerization should already have advanced to 1% to 60%, preferably 1% to 40%, of the total monomer conversion before the metering in of the emulsifiers is commenced.

The latices according to the invention are suitable, inter alia, for coating paper, fabrics, such as, for example, textiles, glass fibers, wood, cardboard, cement, asbestos cement, etc., and as binders in dye and mortar mixtures.

By means of the process according to the invention, it is possible to produce specifically composed copolymer dispersions having non-uniform particle distribution maxima. The copolymer contained in the aqueous dispersion consists of 20% to 92%, preferably 45% to 85%, by weight of vinyl chloride, 5% to 60%, preferably 5% to 30%, by weight of ethylene, 3% to 75%, preferably 5% to 35%, by weight of vinyl esters of branched or unbranched alkanoic acids having 1 to 18 carbon atoms and/or acrylic acid esters of branched or unbranched alkanols having 1 to 12 carbons. Such vinyl esters with branched or unbranched alkanoic acids having 1 to 18 carbon atoms are, for example, vinyl formiate, vinyl acetate, vinyl propionate, vinyl laurate, vinyl stearate, vinyl isotridecanoate, and vinyl versatate. Versatic ® acids are synthetically produced highly branched alkanoic acids having a range of carbon atoms from $C_9$ to $C_{18}$.

The following may be mentioned as acrylic acid esters of branched or unbranched alkanols having 1 to 12 carbon atoms: methyl acrylate, ethyl acrylate, n-propyl acrylate, isopropyl acrylate, n-butyl acrylate, t-butyl acrylate, hexyl acrylate, 2-ethyl hexyl acrylate, octyl acrylate and dodecyl acrylate.

There comes into consideration as other monomers copolymerizable with vinyl chloride, ethylene and vinyl alkanoates or alkyl acrylates, in quantities of 0 to 15% by weight, especially α-olefins having more than 2 carbon atoms, such as propylene, butene, octene, dodecene; esters of alkenoic acids having 4 to 8 carbon atoms, such as crotonic acid, methacrylic acid, with alkanols having 1 to 12 carbon atoms; monoesters or diesters of alkenedioic acids having 4 to 8 carbon atoms, such as fumaric acid or maleic acid with aliphatic alkanols having 1 to 12 carbon atoms; esters of alkenoic acids having 3 to 8 carbon atoms with alcohols having 2 to 8 carbon atoms that contain functional groups, particularly hydroxyl groups and epoxy groups, such as glycidyl alcohol, polyhydric alcohols or alkanediols having 2 to 8 carbon atoms, such as ethylene glycol, propylene glycol, butylene glycol; vinyl ethers, preferably vinyl ethers with alkyl groups having 2 to 12 carbon atoms, such as, for example, vinyl ethyl ether, vinyl butyl ether; vinyl and allyl compounds of, for example, silanes, acetoacetic acid, diacetoacetic acid, glycidyl alcohol, alkanediols, amino alkanols, lactams, particularly caprolactam, α-chloroalkanoic acids, dichlorotriazines; and functional compounds copolymerizable with vinyl chloride and ethylene, such as, for example, acryltrialkoxysilanes. It may furthermore by very helpful to use monomers having a good water-solubility, such as alkenoic acids having from 3 to 5 carbon atoms, such as, for example, acrylic acid, crotonic acid; amides of these acids, such as acrylic acid amide, N-methylol acrylic acid amide, crotonic acid amide; monovinyl esters and monoallyl esters of alkanedioic acids and alkanepolycarboxylic acids or also acrylamidoglycolic acid. Even in the absence of the other monomers, copolymerizable with vinyl chloride and ethylene, it is preferable to employ the above-water soluble monomers in amounts of from 0 15%, preferably 1.5% to 4%, by weight of the total monomer content.

The following examples are illustrative of the practice of the invention without being limitative in any respect.

EXAMPLES

General Experimental Directions 1

Table 1, No. 23 (Comparison Tests)

The following were placed in the autoclave:

| Parts | |
|---|---|
| 132.0 | Water, |
| 7.38 | Genapol X 150 ® (isotridecanol adducted with about 15 mols of ethylene oxide), |
| 0.17 | Mersolate K 30 ® (sodium salt of the sulfonate of branched alkanols having about 13 carbon atoms), |
| 0.95 | Vinyl sulfonate, |
| 0.6 | Potassium persulfate |
| 0.001 | Ammonium ferrous sulfate. |

The pH was adjusted to 3 to 3.5 with formic acid and the atmospheric oxygen was displaced by nitrogen. After evacuating and adjusting the temperature to 30° C., 11.46 parts of vinyl chloride and 3.54 parts of vinyl acetate were introduced while stirring, and an equilibrium pressure of 48 bar was obtained by adding ethylene. By adding 0.8 part/hour of 1% Na-formaldehyde sulfoxylate solution in water, the polymerization process was started and controlled to the desired extent. From the beginning of the reaction, 91.71 parts of vinyl chloride and 28.29 parts of vinyl acetate were metered in continuously over the course of nine hours and the pressure was maintained at 48 bar by adding ethylene. Over the same period, 1.5 parts of acrylamide and 1.5 parts of acrylic acid in 10 parts of water were metered in. The pH was maintained at 2.8 to 3.5 with ammonia during the entire polymerization time. When polymerization was completed, the pH value was adjusted to 7.0 to 7.5 by adding ammonia and the pressure in the autoclave was released.

General Experimental Directions 2

(Comparison Tests)

For exact details of quantities, see Table 2, Test No. 15.

About ⅓ of the quantity of Mersolate K 30 ® was added at the beginning, but otherwise the procedure was as in the General Experimental Directions 1 and 3, that is, the remainder of the Mersolate K 30 ® and the Genapol X 150 ® and the vinyl sulfonate were metered in with the remaining monomers.

General Experimental Directions 3

Table 3, No. 14

The procedure is as in the general experimental directions 1, except that only 4.05 parts of Genapol X 150 ® were employed and the 4.05 parts of Genapol X 150 ®, 0.17 part of Mersolate K 30 ® and 0.95 part of vinyl sulfonate were metered in simultaneously with the monomer over the course of four hours. This metering in commences 20 minutes after polymerization of the comonomers present from the beginning had begun.

TABLE 1A (Comparison Tests)

The process starts with the total amount of emulsifier already present. The results show that it is not possible to regulate the particle sizes by varying the quantity of emulsifiers, the reaction temperatures, the stirring, the monomer composition and the final solids content.

| | In % calculated on the comonomers without ethylene | | | | |
|---|---|---|---|---|---|
| | Emulsifiers | | | Water-soluble Auxiliary Monomers | |
| Test No. | Genapol ×150® | Mersolate K 30® | Vinyl Sulfonate | Acrylamide | Acrylic Acid |
| 1 | 8.0(1) | 0.31 | 1.52 | 2.1 | 1.05 |
| 2 | 8.0(1) | 0.31 | 1.31 | 2.05 | 1.02 |
| 3 | 8.0 | 0.31 | 1.31 | 2.05 | 1.02 |
| 4 | 7.9(1) | 0.32 | 1.52 | 2.06 | 1.03 |
| 5 | 7.9 | 0.32 | 1.52 | 2.06 | 1.03 |
| 6 | 7.9 | 0.32 | 1.52 | 2.06 | 1.03 |
| 7 | 7.8 | 0.31 | 1.56 | — | 1.11 |
| 8 | 7.8 | 0.3 | 1.5 | 2.0 | 1.0 |
| 9 | 7.8 | — | 1.5 | 2.0 | 2.0 |
| 10 | 7.6 | 0.19 | 1.5 | 2.0 | 1.0 |
| 11 | 7.5 | 0.25 | 1.5 | 2.0 | 2.0 |
| 12 | 6.8 | 0.19 | 0.94 | 1.25 | 0.63 |
| 13 | 6.6(1) | 0.25 | 1.50 | 2.0 | 2.0 |
| 14 | 6.6(1) | 0.22 | 0.75 | 1.0 | 1.0 |
| 15 | 6.5 | 0.25 | 1.25 | 1.67 | 0.83 |
| 16 | 6.5 | 0.25 | 1.25 | 1.67 | 0.83 |
| 17 | 6.4 | 0.19 | 0.94 | 1.25 | 0.62 |
| 18 | 6.4 | 0.19 | 0.94 | 1.25 | 0.62 |
| 19 | 6.2 | 0.31 | 1.52 | 2.05 | 1.02 |
| 20 | 6.0 | 0.19 | 0.94 | 1.25 | 0.62 |
| 21 | 5.5 | 0.31 | 1.53 | 2.3 | 1.15 |
| 22 | 5.4 | 0.13 | 0.69 | 1.11 | 1.11 |
| 23 | 5.4 | 0.13 | 0.7 | 1.11 | 1.11 |
| 24(3) | 5.4 | 1.8 | — | — | — |
| 25 | 5.1 | 0.2 | 0.63 | 1.01 | 1.01 |
| 26 | 4.9 | 0.2 | 0.63 | 1.01 | 1.01 |
| 27 | 4.9 | 0.2 | 0.63 | 1.01 | 1.01 |
| 28 | 4.9 | 0.2 | 0.63 | 1.01 | 1.01 |
| 29 | 4.9 | 0.1 | 0.73 | 1.01 | 1.01 |
| 30 | 4.9 | 0.2 | 0.63 | 1.01 | 1.01 |
| 31 | 4.9 | 0.2 | 0.63 | 1.01 | 1.01 |
| 32 | 4.9 | 0.2 | 0.63 | 1.01 | 1.01 |
| 33 | 4.9 | 0.2 | 0.63 | 1.01 | 3.03 |
| 34 | 4.9 | 0.22 | 0.75 | 1.0 | 1.0 |
| 35 | 4.8 | 0.21 | 0.71 | 1.0 | 1.0 |
| 36 | 4.8 | 0.22 | 0.75 | 1.0 | 1.0 |
| 37 | 4.6(1) | 0.19 | 0.68 | 0.95 | 0.95 |
| 38 | 4.3(1) | 0.18 | 0.64 | — | 0.89 |
| 39 | 3.0 | 0.22 | 0.8 | 1.11 | 1.11 |
| 40 | 3.0 | 3.9(2) | 1.54 | 2.6 | 1.3 |
| 41 | 2.7 | 3.9(2) | 1.54 | 2.6 | 1.3 |
| 42 | 2.1 | 0.22 | 0.8 | 1.11 | 1.11 |

-continued

| | In % calculated on the comonomers without ethylene | | | | |
|---|---|---|---|---|---|
| | Emulsifiers | | | Water-soluble Auxiliary Monomers | |
| Test No. | Genapol X 150® | Mersolate K 30® | Vinyl Sulfonate | Acryl- amide | Acrylic Acid |
| 43 | 1.0 | 0.64 | 0.7 | 2.0 | 1.0 |

(1) - Arkopal® mixture N 100/N 230 in a ratio of 1:2 (Arkopal N 100® is nonylphenol adducted with about 10 ethylene oxide units and Arkopal N 230® is nonylphenol adducted with about 23 ethylene oxide units)
(2) - Aerosol 22® (Tetrasodium N-(1,2-dicarboxyethyl)-N-octadecyl-sulfosuccinamate)
(3) - All monomers were introduced at the beginning.

TABLE 1B

| | Comonomers in % (without ethylene = 100%) | | | Stirrer | |
|---|---|---|---|---|---|
| Test No. | Vinyl Chloride | Vinyl Acetate | Type of Monomer | Rev/Min | Type |
| 1 | 84 | 16 | — | 160 | Paddle |
| 2 | 87 | 13 | — | 80 | Anchor 1 |
| 3 | 87 | 13 | — | 80 | Anchor 1 |
| 4 | 80 | 18 | 2 triethoxyvinyl-silane | 170 | Anchor 3 |
| 5 | 80 | 20 | — | 200 | Anchor 3 |
| 6 | 80 | 20 | — | 100 | Anchor 2 |
| 7 | 85 | 10 | 5 methylol-acrylamide | 100 | Anchor 3 |
| 8 | 80 | 20 | — | 100 | Anchor 2 |
| 9 | 87 | 13 | — | 100 | Anchor 3 |
| 10 | 83 | 14 | 3 1-allylamino-3,5-dichlorotriazine | 100 | Anchor 3 |
| 11 | 87 | 13 | — | 100 | Anchor 2 |
| 12 | 85 | 15 | — | 150 | Anchor 3 |
| 13 | 86 | — | 14 vinyl versatate | 100 | Anchor 3 |
| 14 | 71 | — | 29 butyl acrylate | 100 | Anchor 3 |
| 15 | 86 | 14 | — | 150 | Anchor 3 |
| 16 | 80 | 20 | — | 100 | Anchor 2 |
| 17 | 82 | 12.3 | 5,7 N-vinyl capro-lactam | 100 | Anchor 3 |
| 18 | 82 | 14.5 | 3,5 N-methylol acrylamide | 100 | Anchor 3 |
| 19 | 87 | 13 | — | 80 | Anchor 1 |
| 20 | 78 | 11 | 11 glycidyl meth- | 100 | Anchor 3 |
| 21 | 80 | 20 | — | 70 | Anchor 4 |
| 22 | 76 | 23 | 1 crotonic acid | 100 | Anchor 3 |
| 23 | 76 | 24 | — | 80 | Anchor 1 |
| 24 | 44 | — | 56 butyl acrylate | 100 | Anchor 3 |
| 25 | 76 | 19 | 5 hydroxypropyl-acrylate | 100 | Anchor 3 |
| 26 | 76 | 23 | 1 triethoxyacryl-silane | 100 | Anchor 3 |
| 27 | 76 | 24 | — | 70 | Anchor 4 |
| 28 | 76 | 24 | — | 100 | Anchor 3 |
| 29 | 85 | 15 | — | 80 | Anchor 3 |
| 30 | 73 | 22 | 5 hydroxypropyl acrylate | 100 | Anchor 3 |
| 31 | 76 | 23 | 1 triethoxyvinyl-silane | 100 | Anchor 3 |
| 32 | 75 | 23 | 2 triethoxyacryl-silane | 100 | Anchor 3 |
| 33 | 76 | 18 | 3 crotonic acid | 100 | Anchor 3 |
| 34 | 71 | — | 29 butyl acrylate | 100 | Anchor 3 |
| 35 | 72 | — | 14 each of butyl acrylate and hydroxypropyl acrylate | 100 | Anchor 3 |
| 36 | 64 | — | 36 butyl acrylate | 100 | Anchor 3 |
| 37 | 30 | 70 | — | 100 | Anchor 3 |
| 38 | 30 | 69 | 1 N-methylolacryl-amide | 100 | Anchor 3 |
| 39 | 76 | 24 | — | 100 | Anchor 3 |
| 40 | 64 | — | 36 butyl acrylate | 100 | Anchor 3 |
| 41 | 64 | — | 36 butyl acrylate | 100 | Anchor 3 |
| 42 | 76 | 24 | — | 100 | Anchor 3 |
| 43 | 75 | — | 27 butyl acrylate | 100 | Anchor 3 |

The anchor stirrers 1 to 4 differ in the number of stirrer arms and in the number of baffles used.

(1 = A 18, 2 = A 22, 3 = A 28, 4 = A 26).

TABLE 1C

| Test No. | Ethylene Pressure Bar | Reaction Temperature °C. | Final Solids Content % | Particle Size Distribution in μ |
|---|---|---|---|---|
| 1 | 55 | 30 | 50 | 0.05–0.07 |
| 2 | 55 | 30 | 50 | 0.05–0.09 |
| 3 | 70 | 30 | 50 | 0.05–0.10 |
| 4 | 55 | 30 | 50 | 0.05–0.09 |
| 5 | 60 | 30 | 60 | 0.05–0.12 |
| 6 | 55 | 30 | 50 | 0.03–0.08 |
| 7 | 55 | 30 | 50 | 0.04–0.075 |
| 8 | 80 | 40 | 40 | 0.04–0.08 |
| 9 | 50 | 30 | 50 | 0.02–0.06 |
| 10 | 45 | 30 | 50 | 0.04–0.08 |
| 11 | 35 | 10 | 50 | 0.03–0.08 |
| 12 | 50 | 30 | 55 | 0.04–0.08 |
| 13 | 70 | 30 | 50 | 0.04–0.11 |
| 14 | 30 | 30 | 50 | 0.03–0.08 |
| 15 | 70 | 30 | 45 | 0.04–0.08 |
| 16 | 85 | 30 | 50 | 0.03–0.08 |
| 17 | 40 | 30 | 50 | 0.04–0.09 |
| 18 | 35 | 30 | 50 | 0.05–0.11 |
| 19 | 75 | 30 | 50 | 0.03–0.08 |
| 20 | 40 | 30 | 50 | 0.03–0.11 |
| 21 | 50 | 30 | 50 | 0.05–0.07 |
| 22 | 100 | 80 | 50 | 0.05–0.08 |
| 23 | 48 | 30 | 50 | 0.04–0.09 |
| 24 | 3 | 20 | 50 | 0.04–0.09 |
| 25 | 55 | 40 | 50 | 0.03–0.11 |
| 26 | 60 | 40 | 50 | 0.06–0.11 |
| 27 | 30 | 45 | 50 | 0.04–0.11 |
| 28 | 30 | 30 | 50 | 0.05–0.08 |
| 29 | 55 | 40 | 50 | 0.06–0.10 |
| 30 | 25 | 40 | 50 | 0.04–0.08 |
| 31 | 50 | 40 | 50 | 0.05–0.10 |
| 32 | 50 | 40 | 50 | 0.04–0.08 |
| 33 | 50 | 40 | 50 | 0.05–0.11 |
| 34 | 35 | 30 | 50 | 0.04–0.08 |
| 35 | 35 | 30 | 50 | 0.06–0.09 |
| 36 | 35 | 30 | 50 | 0.05–0.11 |
| 37 | 50 | 40 | 50 | 0.06–0.11 |
| 38 | 50 | 30 | 50 | 0.06–0.11 |
| 39 | 50 | 30 | 50 | 0.05–0.09 |
| 40 | 55 | 40 | 25 | 0.04–0.09 |
| 41 | — | 40 | 25 | 0.04–0.11 |
| 42 | 50 | 30 | 50 | 0.06–0.12 |
| 43 | 40 | 40 | 50 | 0.07–0.11 |

TABLE 2A (Comparison Tests)

0.1% of Mersolate K 30 ® was introduced at the start and the remaining quantities of emulsifier metered in. Compared with introducing all of the emulsifier at the beginning (Table 1A), in this case, an increase in particle size can be observed, but the particle size cannot be regulated.

| | In % calculated on Comonomer without ethylene | | | | |
|---|---|---|---|---|---|
| | Emulsifiers | | | Water Soluble Auxiliary Monomers | |
| Test No. | Genapol X 150® | Mersolate K 30® | Vinyl Sulfonate | Acryl-amide | Acrylic Acid |
| 1 | 4.8 | 0.25 | 0.56 | 0.89 | 0.89 |
| 2 | 4.6 | 0.32 | 0.73 | 1.08 | 1.08 |
| 3 | 4.6 | 0.28 | 0.68 | 0.95 | 0.95 |
| 4 | 4.6 | 0.32 | 0.81 | 1.08 | 1.08 |
| 5 | 4.3 | 0.25 | 0.56 | 0.89 | 0.89 |
| 6 | 4.3 | 0.25 | 0.56 | 0.89 | 0.89 |
| 7 | 4.3 | 0.25 | 0.56 | 0.89 | 0.89 |
| 8 | 4.3 | 0.25 | 0.56 | 0.89 | 0.89 |
| 9 | 4.3 | 0.25 | 0.56 | 0.89 | 0.89 |
| 10 | 4.3 | 0.25 | 0.56 | 0.89 | 0.89 |
| 11 | 4.3 | 0.25 | 0.56 | 0.89 | 0.89 |
| 12 | 4.3 | 0.25 | 0.56 | 0.89 | 0.89 |
| 13 | 3.8 | 0.30 | 0.73 | 1.01 | 1.01 |
| 14 | 3.8 | 0.30 | 0.73 | 0.01 | 1.01 |

-continued

| | In % calculated on Comonomer without ethylene | | | | |
|---|---|---|---|---|---|
| | Emulsifiers | | | Water Soluble Auxiliary Monomers | |
| Test No. | Genapol X 150® | Mersolate K 30® | Vinyl Sulfonate | Acryl- amide | Acrylic Acid |
| 15 | 2.7 | 0.11 | 0.63 | 0.83 | 0.83 |
| 16 | 1.25 | 0.3 | 0.8 | 1.11 | 1.11 |
| 17 | 4.9* | 0.2 | 0.63 | 1.0 | 1.0 |

*30% introduced at the beginning

TABLE 2B

| | Comonomers in % (without ethylene = 100%) | | | Stirrer | |
|---|---|---|---|---|---|
| Test No. | Vinyl Chlo- ride | Vinyl Ace- tate | % Type of Monomer | Rev/Min | Type |
| 1 | 68 | 22 | 10 hydroxypropyl acrylate | 100 | Anchor 3 |
| 2 | 76 | 24 | — | 80 | Anchor 1 |
| 3 | 76 | 24 | — | 100 | Anchor 3 |
| 4 | 76 | 24 | — | 80 | Anchor 1 |
| 5 | 68 | 22 | 10 hydroxypropyl acrylate | 100 | Anchor 3 |
| 6 | 68 | 22 | 10 glycidyl methacrylate | 100 | Anchor 3 |
| 7 | 67 | 33 | 0.01 allylmethacrylate | 100 | Anchor 3 |
| 8 | 67 | 33 | 0.05 allylmethacrylate | 100 | Anchor 3 |
| 9 | 67 | 33 | 0.03 allylmethacrylate | 100 | Anchor 3 |
| 10 | 68 | 30 | 2 allyl monoacetoacetate | 100 | Anchor 3 |
| 11 | 68 | 30 | 2 allyl diacetoacetate | 100 | Anchor 3 |
| 12 | 68 | 30 | 2 triethoxyvinylsilane | 100 | Anchor 3 |
| 13 | 76 | 24 | — | 100 | Anchor 3 |
| 14 | 76 | 24 | — | 100 | Anchor 3 |
| 15 | 76 | 24 | — | 100 | Anchor 3 |
| 16 | 76 | 24 | — | 100 | Anchor 3 |
| 17 | 76 | 24 | — | 70 | Anchor 4 |

TABLE 2C

| Test No. | Ethylene Pressure Bar | Reaction Temperature °C. | Final Solids Content % | Particle Size Distribution in μ |
|---|---|---|---|---|
| 1 | 11 | 25 | 55 | 0.11–0.20 |
| 2 | 50 | 30 | 60 | 0.08–0.16 |
| 3 | 50 | 30 | 53 | 0.08–0.16 |
| 4 | 55 | 30 | 57 | 0.08–0.13 |
| 5 | 10 | 25 | 54 | 0.10–0.19 |
| 6 | 10 | 25 | 52 | 0.07–0.13 |
| 7 | 10 | 25 | 50 | 0.08–0.13 |
| 8 | 10 | 25 | 50 | 0.07–0.13 |
| 9 | 5 | 25 | 50 | 0.08–0.16 |
| 10 | 10 | 25 | 50 | 0.13–0.19 |
| 11 | 10 | 25 | 50 | 0.09–0.16 |
| 12 | 10 | 25 | 50 | 0.06–0.13 |
| 13 | 50 | 30 | 55 | 0.09–0.15 |
| 14 | 55 | 30 | 60 | 0.09–0.17 |
| 15 | 50 | 30 | 50 | 0.06–0.16 |
| 16 | 50 | 30 | | Dispersion markedly coagulated |
| 17 | 20 | 35 | 50 | 0.08–0.19 |

TABLE 3A (The Invention)

When metering in the entire quantity of emulsifier, it is possible to regulate the particle size distribution by reducing the quantity of emulsifier. The composition of the resin and the comonomers used do not adversely affect the process. The type of stirrer and its speed also has no significant influence (see Nos. 10 and 11). For regulation by delaying the commencement of metering in, see Nos. 3 to 5 and 15 to 17.

| | In % calculated on comonomer without ethylene | | | | |
|---|---|---|---|---|---|
| | Emulsifiers | | | Water Soluble Auxiliary Monomers | |
| Test No. | Genapol X 150® | Mersolate K 30® | Vinyl Sulfonate | Acryl- amide | Acrylic Acid |
| 1 | 5.4 | 0.22 | 0.80 | 1.11 | 1.11 |
| 2(1) | 4.9 | 0.20 | 0.73 | 1.01 | 1.01 |
| 3(1) | 4.9 | 0.20 | 0.73 | 1.01 | 1.01 |
| 4(2) | 4.9 | 0.20 | 0.73 | 1.01 | 1.01 |
| 5(3) | 4.9 | 0.22 | 0.80 | 1.11 | 1.11 |
| 6(3) | 4.2 | 0.22 | 0.69 | 1.11 | 1.11 |
| 7 | 3.8 | 0.22 | 0.80 | 1.11 | 1.11 |
| 8 | 3.8 | 0.13 | 0.70 | 1.11 | 1.11 |
| 9 | 3.8 | 0.20 | 0.63 | 1.0 | 1.0 |
| 10 | 3.0 | 0.22 | 0.80 | 1.11 | 1.11 |
| 11 | 3.0 | 0.13 | 0.70 | 1.11 | 1.11 |
| 12 | 3.0 | 0.20 | 0.70 | 1.11 | 1.11 |
| 13 | 2.08 | 0.13 | 0.69 | 0.83 | 0.83 |
| 14 | 2.08 | 0.22 | 0.80 | 1.11 | 1.11 |
| 15(1) | 1.25 | 0.22 | 0.80 | 1.11 | 1.11 |
| 16(2) | 1.25 | 0.22 | 0.80 | 1.11 | 1.11 |
| 17(3) | 1.25 | 0.2 | 0.80 | 1.11 | 1.11 |

(1) after ~5% conversion
(2) after ~15% conversion
(3) after ~30% conversion

TABLE 3B

| | Comonomers in % (without ethylene = 100%) | | | Stirrer | |
|---|---|---|---|---|---|
| Test No. | Vinyl Chlo- ride | Vinyl Ace- tate | % Type of Monomer | Rev/Min | Type |
| 1 | 76 | 24 | — | 100 | Anchor 3 |
| 2 | 85 | 15 | — | 100 | Anchor 3 |
| 3 | 85 | 15 | — | 80 | Anchor 3 |
| 4 | 76 | 24 | — | 80 | Anchor 3 |
| 5 | 68 | 22 | 10 hydroxypropyl acrylate | 100 | Anchor 3 |
| 6 | 86 | 14 | — | 100 | Anchor 3 |
| 7 | 76 | 24 | 2 allyl diacetoacetate | 100 | Anchor 3 |
| 8 | 76 | 24 | — | 80 | Anchor 1 |
| 9 | 76 | 24 | — | 70 | Anchor 1 |
| 10 | 76 | 24 | — | 100 | Anchor 3 |
| 11 | 76 | 24 | — | 70 | Anchor 1 |
| 12 | 76 | 24 | — | 80 | Anchor 1 |
| 13 | 76 | 24 | — | 100 | Anchor 3 |
| 14 | 76 | 22 | 2 triethoxyvinylsilane | 100 | Anchor 3 |
| 15 | 76 | 24 | — | 100 | Anchor 3 |
| 16 | 76 | 24 | — | 100 | Anchor 3 |
| 17 | 76 | 24 | — | 100 | Anchor 3 |

TABLE 3C

| Test No. | Ethylene Pressure Bar | Reaction Temperature °C. | Final Solids Content % | Particle Size Distribution in μ |
|---|---|---|---|---|
| 1 | 50 | 30 | 50 | 0.04–0.08 |
| 2 | 55 | 40 | 50 | 0.08–0.15 |
| 3 | 50 | 40 | 50 | 0.10–0.14 |
| 4 | 50 | 40 | 50 | 0.05–0.16 |
| 5 | 60 | 30 | 50 | 0.03–0.16 and approx. 5% by weight 0.4–0.55 |
| 6 | 50 | 30 | 50 | 0.06–0.09 and approx. 5% by weight 0.44–0.55 |
| 7 | 55 | 30 | 50 | 0.06–0.11 and approx. 10% by weight 0.26–0.4 |
| 8 | 55 | 30 | 50 | 0.04–0.14 and approx. 5% by weight 0.24–0.44 |
| 9 | 20 | 35 | 50 | 0.02–0.13 and approx. 5% by weight 0.14–0.43 |
| 10 | 50 | 30 | 45 | 0.04–0.12 and approx. |

TABLE 3C-continued

| Test No. | Ethylene Pressure Bar | Reaction Temperature °C. | Final Solids Content % | Particle Size Distribution in μ |
|---|---|---|---|---|
| 11 | 45 | 30 | 50 | 15% by weight 0.30–0.40 0.06–0.18 and approx. 15% by weight 0.34–0.48 |
| 12 | 50 | 30 | 62 | 0.06–0.15 and approx. 15% by weight 0.3–0.48 |
| 13 | 60 | 30 | 50 | 0.06–0.12 and approx. 30% by weight 0.13–0.4 |
| 14 | 50 | 30 | 40 | 0.06–0.12 and approx. 30% by weight 0.4–0.6 |
| 15 | 50 | 30 | 50 | 0.1–0.15 and approx. 50% by weight 0.25–0.42 |
| 16 | 55 | 30 | 50 | 0.02–0.04 and approx. 50% by weight 0.4–0.84 |
| 17 | 55 | 30 | 50 | 0.02–0.046 and approx. 50% by weight 0.4–0.84–1.20 |

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. Aqueous ethylene/vinyl chloride/vinyl alkanoate and/or alkyl acrylate copolymer dispersions having a non-uniform particle size, in which one particle size distribution maximum is at 0.03 to 0.2μ and a second maximum is at 0.15 to 1μ where said second maximum particle size range differs from the first by at least 0.1μ and wherein the mass of particles in the particle size distribution curve of the second maximum is from 5% to 60% of the total mass of particles, said dispersion having a solids content of between 20% and 70% by weight and an emulsifier content of from 0.5% to 10% by weight, based on the total amount of monomers, said copolymer consisting of:
from 20% to 92% by weight of vinyl chloride units,
from 5% to 60% by weight of ethylene units,
from 3% to 75% by weight of monomer units selected from the group consisting of:
(1) vinyl esters of unbranched alkanoic acids having from 1 to 18 carbon atoms,
(2) vinyl esters of branched alkanoic acids having from 4 to 18 carbon atoms,
(3) acrylic acid esters of unbranched alkanols having from 1 to 12 carbon atoms,
(4) acrylic acid esters of branched alkanols having from 3 to 12 carbon atoms, and
(5) mixtures thereof, and
from 0 to 15% by weight of other monomer units copolymerizable with ethylene and vinyl chloride.

2. The aqueous copolymer dispersion of claim 1 wherein said copolymer consists of:
from 45% to 85% by weight of said vinyl chloride units,
from 5% to 30% by weight of said ethylene units, and
from 5% to 35% by weight of said monomer units, 3. The aqueous copolymer dispersion of claim 2 wherein said emulsifier content is from 2% to 6% by weight, based on the total amount of monomers.

4. The aqueous copolymer dispersion of claim 2 having a further content of from 1.5% to 4% by weight, based on the weight of monomers, of water-soluble auxilliary monomer units copolymerizable with vinyl chloride and ethylene.

5. The aqueous copolymer dispersion of claim 4 wherein said monomer units are vinyl acetate units.

6. A process for the production of an aqueous ethylene/vinyl chloride/vinyl alkanoate and/or alkyl acrylate copolymer dispersion wherein said copolymer consists of:
from 20% to 92% by weight of vinyl chloride units,
from 5% to 60% by weight of ethylene units,
from 3% to 75% by weight of monomer units selected from the group consisting of:
(1) vinyl esters of unbranched alkanoic acids having from 1 to 18 carbon atoms,
(2) vinyl esters of branched alkanoic acids having from 4 to 18 carbon atoms,
(3) acrylic acid esters of unbranched alkanols having from 1 to 12 carbon atoms,
(4) acrylic acid esters of branched alkanols having from 3 to 12 carbon atoms, and
(5) mixtures thereof, and
from 0 to 15% by weight of other monomer units copolymerizable with ethylene and vinyl chloride,
having a non-uniform particle size, in which one particle size distribution maximum is at 0.03 to 2.0μ and a second maximum is at 0.15 to 1μ, where said second maximum particle size range differs from the first by at least 0.1μ and wherein the mass of particles in the particle size distribution curve of the second maximum is from 5% to 60% of the total mass of particles, said copolymer dispersion having a solids content of between 20% and 70% by weight and an emulsifier content of from 0.5% to 10% by weight, based on the total amount of monomers consisting essentially of heating substantially all of the water and at least some of the total amount of vinyl chloride, ethylene, said monomer units, and, optionally, said other monomer units to a temperature of between 0° and 90° C. and at an ethylene pressure of between 1 and 150 bar in the presence of a free-radical polymerization catalyst under agitation, and after a monomer conversion of from 1% to 60% by weight metering in from 0.5% to 10% by weight, based on the total amount of solid copolymer, of at least one polymerization emulsifier, together with the remainder of said water, said vinyl chloride, said ethylene, said monomer units, as well, optionally, of said other monomer units, while maintaining said agitation, temperature and ethylene pressure for a time sufficient to complete monomer polymerization, and recovering said copolymer dispersion.

7. The process of claim 6 wherein said temperature is between 10° and 50° C.

8. The process of claim 6 wherein said ethylene pressure is between 10 and 100 bar.

9. The process of claim 6 wherein said monomer conversion is from 1% to 40% when said emulsifier metering in is begun.

10. The process of claim 6 wherein said copolymer consists of:
from 45% to 85% by weight of said vinyl chloride units,
from 5% to 30% by weight of said ethylene units, and
from 5% to 35% by weight of said monomer units.

11. The process of claim 6 wherein said emulsifier content is from 2% to 6% by weight, based on the total amount of monomers.

12. The process of claim 6 wherein said copolymer has a further content of from 1.5% to 4% by weight, based on the weight of monomers, of water-soluble auxilliary monomer units copolymerizable with vinyl chloride and ethylene.

13. The process of claim 12 wherein said monomer units are vinyl acetate units.

* * * * *